(12) United States Patent
McGregor et al.

(10) Patent No.: US 6,545,281 B1
(45) Date of Patent: Apr. 8, 2003

(54) POCKED SURFACE NEUTRON DETECTOR

(75) Inventors: Douglas McGregor, Whitmore Lake, MI (US); Raymond Klann, Bolingbrook, IL (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 42 days.

(21) Appl. No.: 09/899,201

(22) Filed: Jul. 6, 2001

(51) Int. Cl.$^7$ .................................................. G01T 3/08
(52) U.S. Cl. .............................. 250/370.05; 250/390.01
(58) Field of Search ........................ 250/370.05, 370.04, 250/370.01, 390.01

(56) References Cited

U.S. PATENT DOCUMENTS

| | | | | |
|---|---|---|---|---|
| 5,629,523 A | * | 5/1997 | Ngo et al. | 250/370.05 |
| 5,880,471 A | * | 3/1999 | Schelten et al. | 250/370.05 |
| 5,940,460 A | * | 8/1999 | Seidel et al. | 376/153 |
| 6,072,181 A | * | 6/2000 | Hassard et al. | 250/370.01 |
| 6,479,826 B1 | * | 11/2002 | Klann et al. | 250/370.05 |

FOREIGN PATENT DOCUMENTS

JP             56114382 A   *   9/1981   ............ H01L/31/00

* cited by examiner

*Primary Examiner*—Constantine Hannaher
*Assistant Examiner*—Albert Gagliardi
(74) *Attorney, Agent, or Firm*—Bradley W. Smith; Mark P. Dvorscak; Paul A. Gottlieb

(57) ABSTRACT

The detection efficiency, or sensitivity, of a neutron detector material such as of Si, SiC, amorphous Si, GaAs, or diamond is substantially increased by forming one or more cavities, or holes, in its surface. A neutron reactive material such as of elemental, or any compound of, $^{10}$B, $^6$Li, $^6$LiF, U, or Gd is deposited on the surface of the detector material so as to be disposed within the cavities therein. The portions of the neutron reactive material extending into the detector material substantially increase the probability of an energetic neutron reaction product in the form of a charged particle being directed into and detected by the neutron detector material.

15 Claims, 6 Drawing Sheets

POCKED SURFACE NEUTRON DETECTOR

CONTRACTUAL ORIGIN OF THE INVENTION

The United States Government has rights in this invention pursuant to Contract No. DE-AC02-98CH10913 between the U.S. Department of Energy (DOE) and the University of Chicago representing Argonne National Laboratory.

FIELD OF THE INVENTION

This invention relates generally to energetic particle detectors and is particularly directed to a coated semiconductor detector capable of detecting cold, thermal and epithermal neutrons.

BACKGROUND OF THE INVENTION

Semiconductor detectors coated with neutron reactive materials offer an alternative approach to scintillator-based neutron imaging devices for neutron radiography (normally scintillating screens coupled to photographic film or to other photorecording devices). Neutron reaction film-coated devices typically include Si, bulk GaAs, or diamond detectors, all of which have advantages and disadvantages. Si and bulk GaAs-based devices operate at moderately low voltages, whereas diamond-based films require hundreds of volts to operate. Although diamond-based films appear to be more radiation hard than GaAs, GaAs devices demonstrate superior radiation hardness to neutrons and gamma rays in comparison to Si. Neutron reactive films based on the $^{157}Gd(n,\gamma)^{158}Gd$ reaction show a higher neutron absorption efficiency than $^{10}B(n,\alpha)^7Li$ and $^6Li(n,\alpha)^3H$-based films, however, the combined emission of low energy gamma rays and conversion electrons from $^{157}Gd(n,\gamma)^{158}Gd$ reactions make neutron-induced events difficult to discriminate from background gamma-ray events. The particle energies emitted from the $^6Li(n,\alpha)^3H$ reaction are greater than those emitted from the $^{10}B(n,\alpha)^7Li$ reaction and are much greater than observed from the $^{157}Gd(n,\gamma)^{158}Gd$ reaction. Yet, the optimized film thickness for $^6LiF$ is over ten times greater than needed for $^{10}B$ while producing only a slight increase in neutron detection efficiency. Background gamma rays are less likely to interact in a diamond or Si detector than in GaAs, but previous results have shown that the gamma-ray background interference for $^{10}B$-coated GaAs detectors is low enough to discriminate between neutron and gamma-ray events. Regardless, Si, GaAs, diamond, and a variety of other semiconducting materials can be used as the detector in the present invention.

Referring to FIG. 1, there is shown a simplified schematic illustration of the basic components comprising a $^{10}B$-coated semiconductor neutron detector 10. The neutron detector 10 includes a semiconductor substrate 12 having on one surface thereof a back contact layer 14 which is coupled to a potential, depicted as neutral ground in the figure. Disposed upon the substrate 12 is a front contact 18 that forms a blocking contact upon the semiconductor substrate 12. An active region 16 forms from either the blocking contact 18 potential or through the application of voltage 30 (shown in dotted line form in the figure), or a combination of both the blocking contact 18 and the applied voltage 30. An energetic neutron 22 interacts with the $^{10}B$ film 20, thereby releasing an alpha particle 24 and a $^7Li$ ion 26 in opposite directions. Only one particle from this interaction can enter the active region 16 of the semiconductor substrate 12 which limits detector efficiency. The active region 16 has an internal electric field that causes free charges 34 to separate and drift across the active region 16. The motion of the free charges 34 induces a signal to appear on preamplifier circuit 28 or other sensitive electronics. The preamplifier 28 may be connected to the voltage 30 and the detector 10 through a coupling capacitor 32. The present invention is intended to increase neutron detector efficiency, or sensitivity.

Now referring to FIG. 2, there is shown a simplified schematic illustration of the basic composition and configuration of a $^{10}B$-coated self-biased high-purity epitaxial GaAs neutron detector 11. The neutron detector 11 includes an n-type GaAs substrate 12 having on one surface thereof a back contact layer 14 which is coupled to neutral ground. The GaAs substrate 12 includes a high-purity v-type GaAs active region 16. Disposed on a surface of the high purity v-type GaAs active region 16 is a front contact layer 18 forming a small p+ GaAs layer 36. Disposed upon the p+ GaAs layer is a conductive contact 18. The p+ GaAs layer may instead be replaced by a Schottky barrier contact. A built-in potential at the of the p-type/v-type GaAs junction forms an active region 16 that supplies enough voltage to operate the device. A potential source 30 (shown in dotted line form in the figure) may also be used to power the neutron detector 11 which typically provides a detection signal to a preamplifier 28. Disposed on the front contact layer 18 is a thin layer of Boron-10 film 20. An energetic neutron 22 interacts with the $^{10}B$ film 20, thereby releasing an alpha particle 24 and a $^7Li$ ion 26 in opposite directions. Only one particle from this interaction can enter the high purity v-type GaAs active region 16 of the GaAs substrate 12 which limits detector efficiency. The present invention is intended to increase neutron detector efficiency, or sensitivity.

OBJECTS AND SUMMARY OF THE INVENTION

Accordingly, it is an object of the present invention to provide a neutron detector having increased efficiency for detecting cold, thermal or epithermal neutrons.

It is another object of the present invention to provide a highly sensitive energetic neutron detector which is inexpensive to fabricate, radiation hard, relatively insensitive to gamma-ray background radiation and is readily adapted for use in neutron radiography, imaging devices, or neutron imaging applications in other harsh radiation environments.

It is yet another object of the present invention to provide an energetic neutron detection device which can be operated at room temperature at low voltages and which is compact and rugged.

The present invention contemplates apparatus for detecting energetic neutrons comprising: a particle detecting semiconductor substrate having a first surface including at least one cavity extending into said semiconductor substrate; and a thin neutron responsive layer disposed on the first surface of the semiconductor substrate and responsive to energetic neutrons incident thereon for producing first and second charged reaction particles directed in opposite directions, wherein the neutron responsive layer is further disposed in said at least one cavity for increasing neutron detection efficiency by increasing the likelihood that the charged reaction particles will be directed into the semiconductor substrate.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
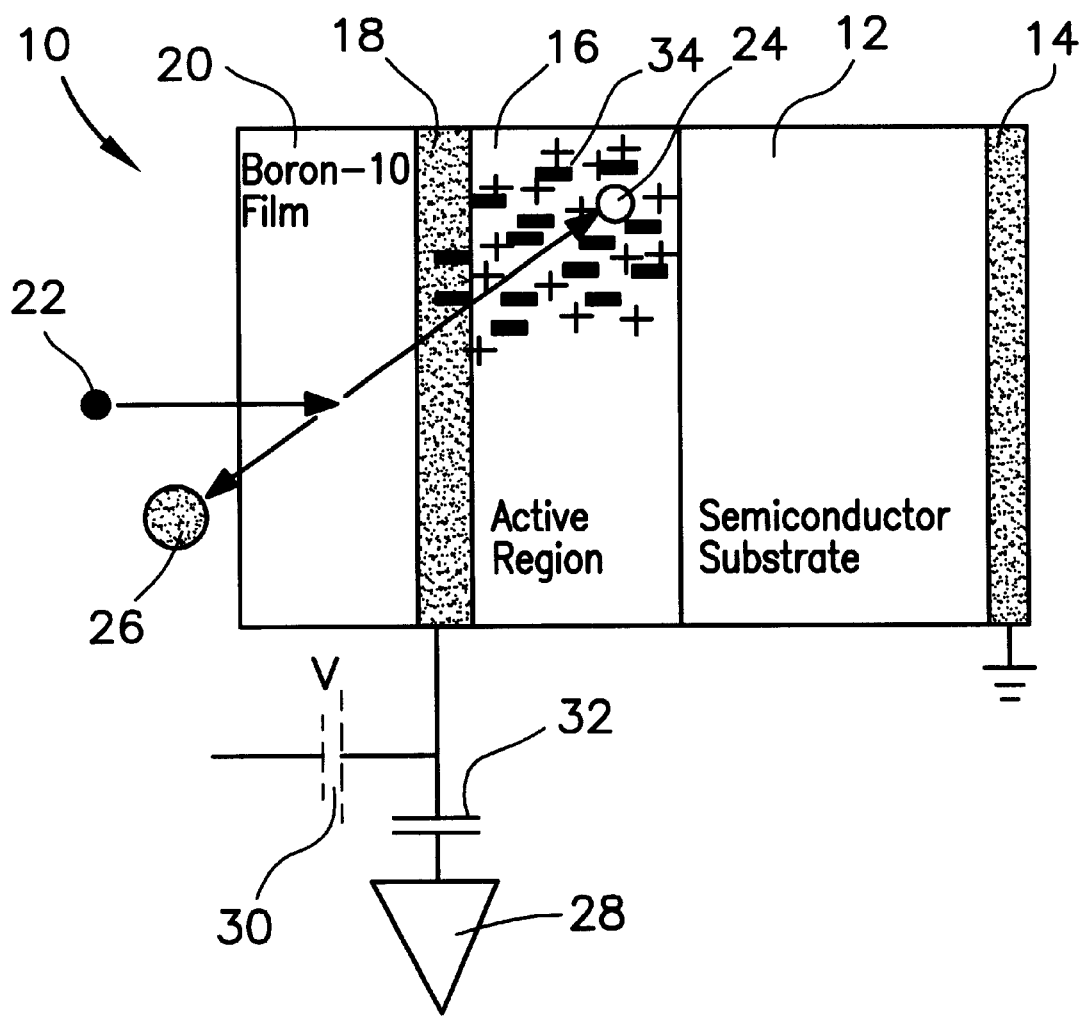
FIG. 1 is a simplified schematic illustration of the basic composition and configuration of a conventional $^{10}$B-coated semiconductor neutron detector with which the present invention is intended for use.

The $^{10}$B(n,$\alpha$)$^7$Li reaction in a conventional $^{10}$B-coated semiconductor neutron detect or leads to the following reaction products and branching ratios:

$$^{10}B + {}^1_0 n \rightarrow \begin{cases} 6\%: & {}^7Li(\text{at } 1.015 \text{ MeV}) + \alpha(\text{at } 1.777 \text{ MeV}), \\ & Q = 2.792 \text{ MeV(to ground state)} \\ 94\%: & {}^7Li^*(\text{at } 0.840 \text{ MeV}) + \alpha(\text{at } 1.470 \text{ MeV}), \\ & Q = 2.310 \text{ MeV(1st excited state)} \end{cases}$$

The thermal neutrons (0.0259 eV) absorbed by $^{10}$B produce energetic particles that are emitted at a 180 degree angle. After absorption, 94% of the reactions leave the $^7$Li ion in its first excited state which rapidly de-excites to the ground state (~$10^{-13}$ seconds) by releasing a 480 keV gamma ray. The remaining 6% of the reactions result in the $^7$Li ion going directly to its ground state. The thermal neutron (0.0259 eV) microscopic absorption cross section is 3840 barns. The microscopic thermal neutron absorption cross section decreases with increasing neutron energy; thus the cross section dependence is proportional to the inverse of the neutron velocity (1/v) over much of the energy range. With a microscopic thermal neutron absorption cross section ($\sigma$) for $^{10}$B of 3840 barns and an atomic density of 1.3×10$^{23}$ atoms/cm$^3$, the resulting macroscopic absorption cross section ($\Sigma$) is 500/cm.

The term "effective range" (denoted L) is the distance through which a particle may travel within the neutron reactive film before its energy decreases below the set minimum detectable threshold, or rather, before its energy decreases below the electronic lower level discriminator (LLD) setting. The term does not take into account additional energy losses from contact "dead regions." The neutron reaction products released do not have equal masses, and therefore do not have equal energies or effective ranges. Neutrons may interact anywhere within the reactive film, and the reaction products lose energy as they move through the neutron reactive film. Reaction product self-absorption reduces the energy transferred to the semiconductor detector, and ultimately limits the maximum film thickness that can be deposited over the semiconductor device. The measured voltage signal is directly proportional to the number of electron-hole pairs excited within the semiconductor. Reaction products that deposit most or all of their energy in the detector will produce much larger voltage signals than those reaction products that lose most of their energy before reaching the detector.

Neutron transmission through the film as a function of distance x can be described by $$I(x)=I_0 e^{-x\sigma_F N_F}=I_0 e^{-x\Sigma_F}, \tag{1}$$

where $I_0$ is the initial neutron flux, $N_F$ is the atomic density of the neutron reactive isotope in the film, $\sigma_F$ is the microscopic thermal neutron absorption cross section of the film, and $\Sigma_F$ is the film macroscopic thermal neutron absorption cross section. The fraction of neutrons absorbed in the film through distance x is $$1 - \frac{I(x)}{I_0} = 1 - e^{-x\sigma_F N_F} = 1 - e^{-x\Sigma_F}, \tag{2}$$

The neutron absorption probability per unit distance is described by $$p(x)dx=\Sigma_F e^{-\Sigma_F x}dx, \tag{3}$$

The angular contribution to self-attenuation must also be addressed. Once a neutron is absorbed and the reaction products are emitted, the probability that a reaction product particle will enter the detector is determined by the solid angle that the particle effective range allows. A neutron interaction taking place at distance x from the detector has a probability of entering the detector as described by the fractional solid angle that subtends the detector surface.

$$p_P(x) = \frac{\Omega(x)}{4\pi} = \frac{2\pi}{4\pi}\left(1 - \frac{x}{L}\right) = 0.5\left(1 - \frac{x}{L}\right), \quad x \leq L, \tag{4}$$

where L is the range of the particle in the coating material and the subscript p relates to the reaction product particle of interest. Since the reactions of interest in the present application release two charged-particle reaction products per event, the total probability of detecting a reaction necessitates adding the detection probability of both particles. It is completely possible that one reaction product may be able to reach the detector while the other reaction product cannot. Interactions occurring near the detector contact result in either particle entering the detector with high probability. As the neutron interaction distance from the semiconductor surface increases, the solid angle of the short-range particle decreases more rapidly than that of the long-range particle, which results in an overall decrease in detection sensitivity.

As mentioned previously, the primary $^{10}B(n,\alpha)^7Li$ reaction (94%) results in the emission of a 1.47 MeV alpha particle and a 840 keV $^7Li$ ion in its first excited state. For the remaining $^{10}B(n,\alpha)^7Li$ reactions, the $^7Li$ ion reduces directly to its ground state resulting in the emission of a 1.777 MeV alpha particle and a 1.015 MeV $^7Li$ ion. The range for a 840 keV $^7Li$ ion in Boron is 1.6 microns, and the range for a 1.47 MeV alpha particle is 3.6 microns.

The previous analysis and equations 1–4, also apply to $^6Li$-based films where the $^6Li(n,\alpha)^3H$ reactions release two energetic particles as well:

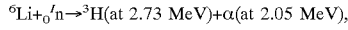

$$^6Li + _0'n \rightarrow {}^3H(\text{at } 2.73 \text{ MeV}) + \alpha(\text{at } 2.05 \text{ MeV}),$$

$$Q = 4.78 \text{ MeV}$$

Figure 3:
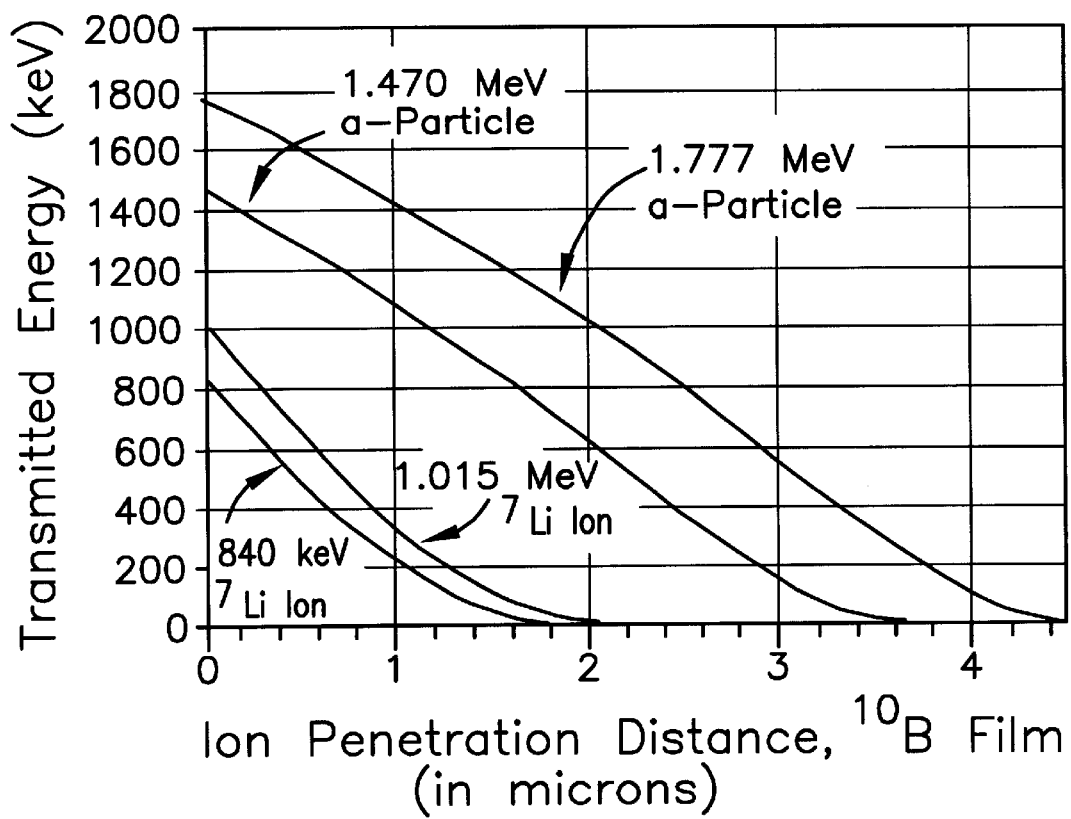
FIG. 3 graphically shows the remaining energy of a transmitted reaction product from the $^{10}$B(n,$\alpha$)$^7$Li reaction as a function of interaction depth in the $^{10}$B material from the contact surface in a neutron detector such as shown in FIG. 1.

The energy absorbed in the detector is simply the original particle energy minus the combined energy lost in the neutron reactive film and the detector contact during transit. Assuming that energy loss in the detector contact is negligible, FIG. 3 shows the energy retained by either charged particle as a function of transit length through a boron film. At any reaction location within the $^{10}B$ film, maximum detector entrance energy will be retained by either particle should either enter the detector in an orthogonal trajectory. Hence, if the interaction occurs in the $^{10}B$ film at a distance of 0.5 $\mu$m away from the detector, the maximum energy retained by the $^7Li$ will be 840 keV, $^7Li$ ion will be 430 keV, and the maximum energy retained by the 1.47 MeV alpha particle will be 1150 keV. For the same interaction distance of 0.5 $\mu$m from the detector, the energy retained by the particle when it reaches the detector decreases as the angle is increased from orthogonal (0"). Given a predetermined minimum detection threshold (or LLD setting), the effective range (L) for either particle can be determined. For instance, as shown in FIG. 3, an LLD setting of 300 keV yields $L_{Li}$ as 0.810 microns and $L_\alpha$ as 2.648 microns.

Figure 4A:
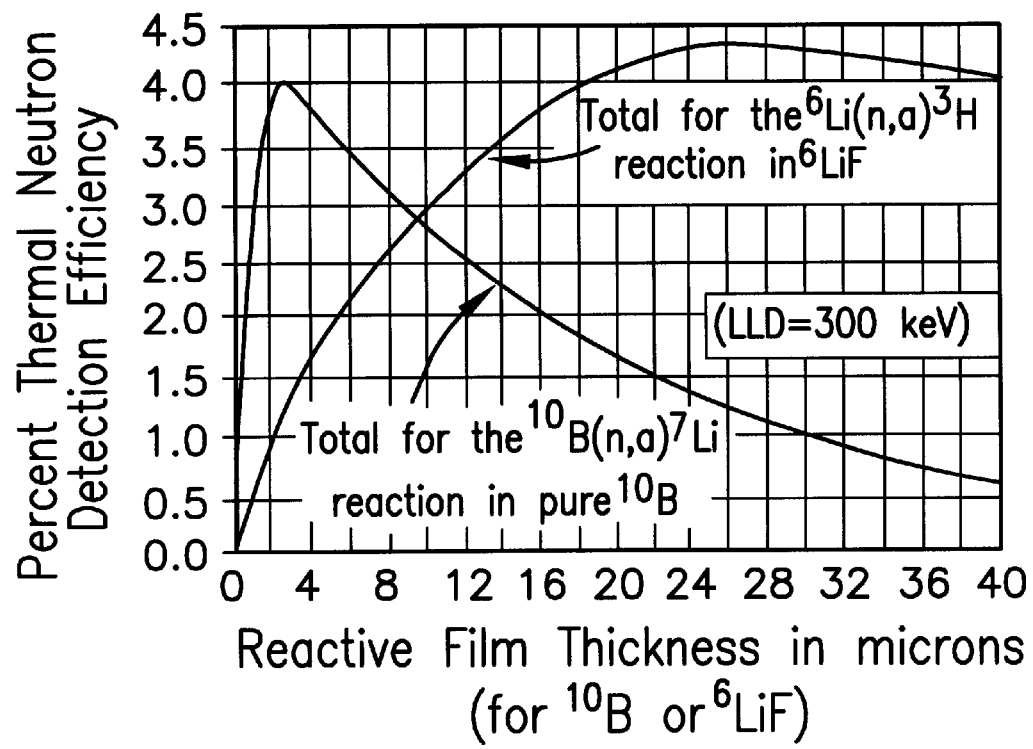
FIG. 4a is a graphic representation of the calculated thermal neutron detection efficiency for a conventional planar $^{10}$B-coated semiconductor detector and the calculated thermal neutron detection efficiency for a conventional planar $^6$LiF-coated semiconductor detector.

A commonly used geometry involves the use of a planar semiconductor detector over which a neutron reactive film has been deposited. Assuming that the neutron beam is perpendicular to the detector front contact, the sensitivity contribution for a reaction product species can be found by integrating the product of the interaction probability (equation 3) and the fractional solid angle (equation 4) over the absorber thickness, $D_F$ (in this case $^{10}B$)

$$S_p(D_F) = 0.5 F_p \left\{ \left(1 + \frac{1}{\Sigma_F L}\right)(1 - e^{-\Sigma_F D_F}) - \frac{D_F}{L} \right\}, \quad (5A)$$

for $D_F \leq L$, and $$S_p(D_F) = 0.5 F_p e^{-\Sigma_F(D_F - L)} \left\{ \left(1 + \frac{1}{\Sigma_F L}\right)(1 - e^{-\Sigma_F L}) - 1 \right\}, \quad (5B)$$

for $D_F > L$, where $F_p$ refers to the branching ratio for the reaction product emissions. The total sensitivity accordingly can be found by adding all of the reaction product sensitivities $$(S(D_F)|)_{Total} = \sum_{p=1}^{N} S_p(D_F), \quad (6)$$

where N is the number of different reaction product emissions. In the case of $^{10}B$-based films, N equals 4. For $^6Li$ based films, N=2. Notice from equation 5B that the value of $S_p$ reduced as $D_F$ becomes larger than the value of L. As a result of this, there will be an optimum neutron reaction film thickness for front-irradiated detectors (see FIG. 4a). Since the minimum particle detection threshold determines the effective range (L), the optimum film thickness is also a function of the LLD setting. From FIG. 4a, with the LLD set at 300 keV, the maximum achievable thermal neutron detection efficiency is 4%. The thermal neutron detection efficiency can be increased to 4.8% by lowering the LLD setting, but only at the expense of accepting more system noise and gamma-ray background interference.

Figure 5:
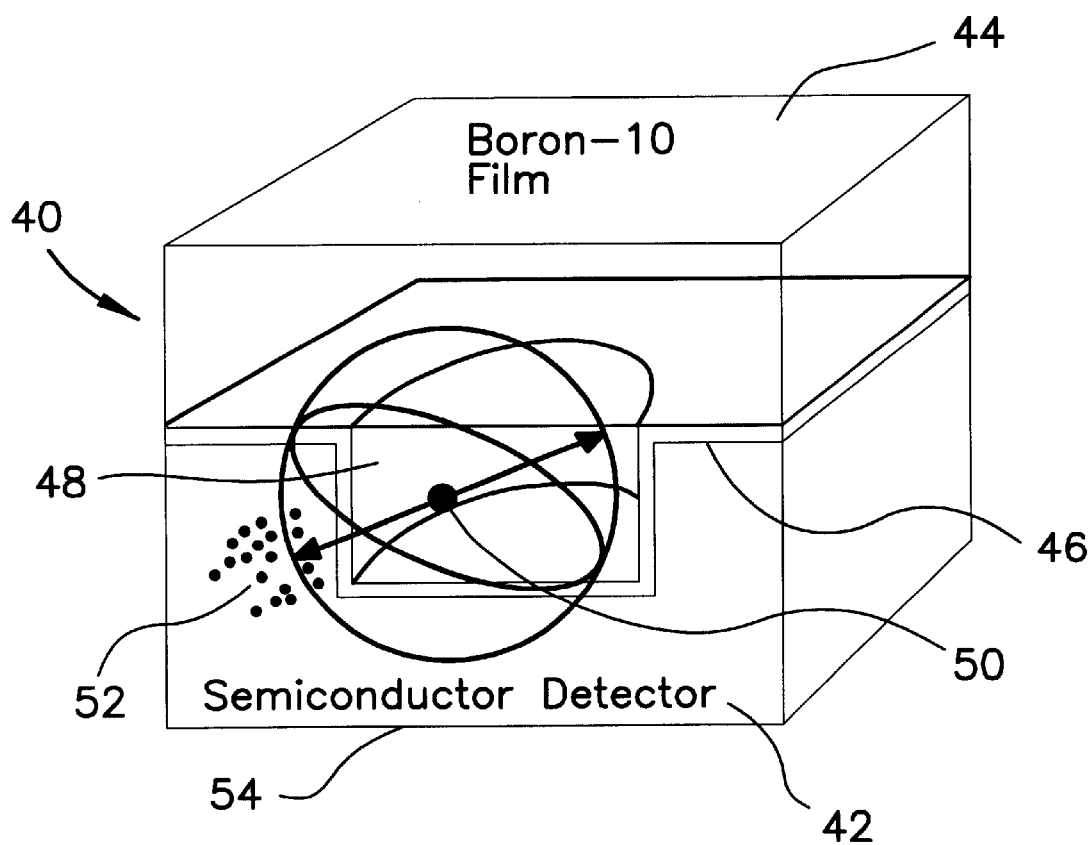
FIG. 5 is a simplified diagrammatic illustration of a single cavity semiconductor detector coated with a neutron reactive material, where the dimensions of the cavity are similar to the total range of the combined charged particle reaction products within the semiconductor detector in accordance with the principals of the present invention.

Referring to FIG. 5, there is shown a simplified schematic illustration of a neutron detector 40 in accordance with the principles of the present invention. Neutron detector 40 includes a semiconductor detector 42 having a first contact region 46 disposed on a first surface thereof and a second contact region 54 disposed on a second, opposed surface thereof. The first surface of the semiconductor detector 42 includes a generally cylindrical cavity 48 disposed therein. Applied to the first surface of the semiconductor detector 42 is a thin Boron-10 film 44. The Boron-10 film 44 is depicted as coating and filling the cavities 48. In the neutron detector 40, the semiconductor detector 42 performs a particle detecting function, while the Boron-10 film 44 reacts with energetic neutrons to produce first and second particles traveling in opposite directions within the Boron-10 film. Shown in the figure is a neutron 50 transitting the Boron-10 film 44 within the cylindrical cavity 48 in the semiconductor detector 42. Upon the absorption of the neutron 50 with a $^{10}B$ atom, an $\alpha$ particle is emitted in a first direction and $^7Li$ is emitted in a second opposed direction as shown by the two arrows extending from the neutron 50 in opposite directions. The probability of a charged particle reaction product entering the semiconductor detector 42 is shown at location 52 within the detector. The recessed nature of the cylindrical cavity 48 within the semiconductor detector 42 substantially increases the probability that one of the charged particles arising from neutron interaction with $^{10}B$ will reach the semiconductor detector 42 to permit detection of the energetic neutrons.

Figure 6:
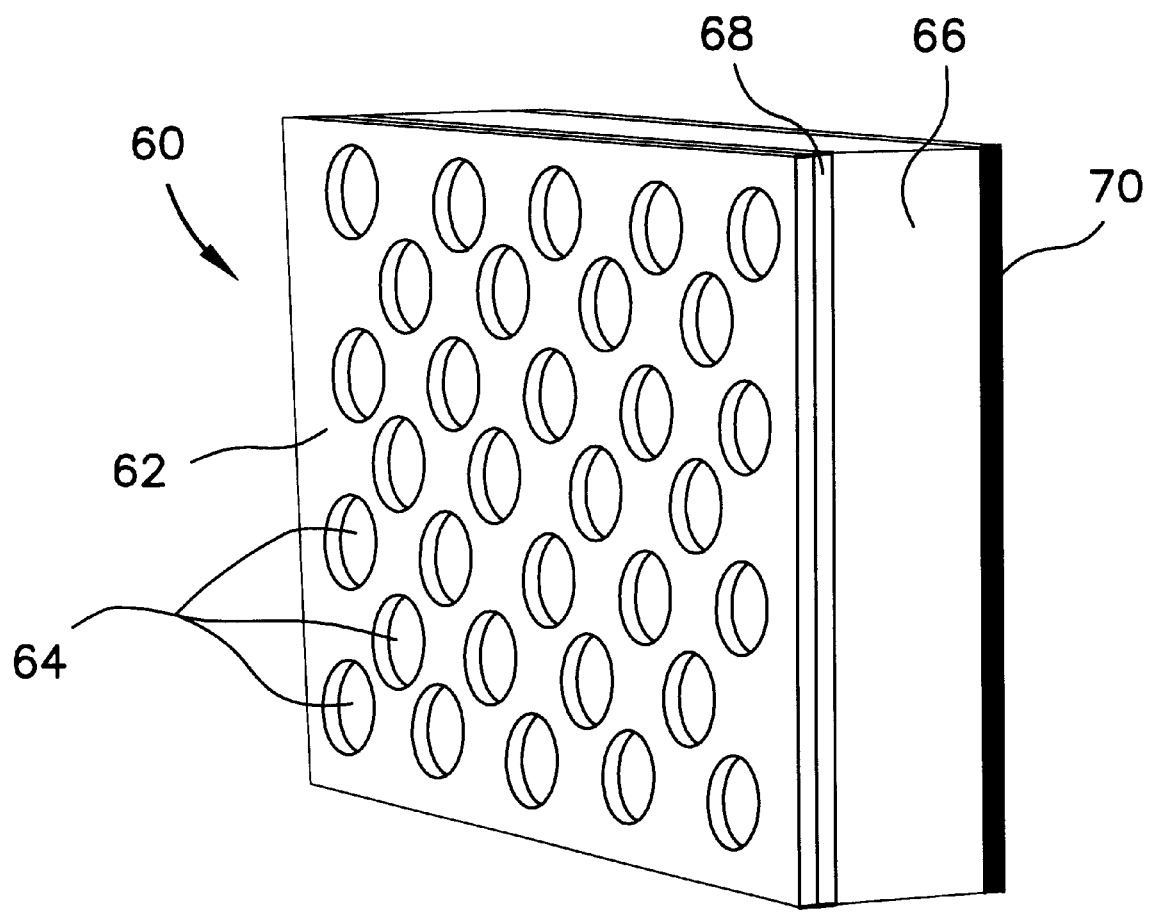
FIG. 6 is a perspective view of the surface of semiconductor detector incorporating plural spaced cavities therein, wherein the conductive electrical surface contact is coated with a neutron reactive material which emits charged particle reaction products as a result of an energetic neutron being incident thereon.

Referring to FIG. 6, there is shown a perspective view of another embodiment of a neutron detector 60 in accordance with the principles of the present invention. In the embodiment shown in FIG. 6, a semiconductor detector 66 has disposed on a first surface thereof a first contact region 68. A second contact region 70 is disposed on a second, opposed surface of the semiconductor detector 66. The first surface of the semiconductor detector 66 is provided with plural cavities 64 arranged in a spaced manner on the surface. Applied to the first contact region 68 on the semiconductor detector 66 is a neutron reactive layer 62 in the form of a thin film. The neutron reactive layer 62 coats the inside of the cavities 64 and may be applied in such a way as to fill them. The neutron reactive layer 62 may be comprised of either elemental, or a compound of, natural B, $^{10}B$, natural Li, $^6Li$, U, natural Gd, $^{155}Gd$, or $^{157}Gd$, or a hydrogen containing material such as plastic or high density polyethylene.

Any number of materials can be used for the substrate onto which the neutron reactive thin film is applied, which can be either semiconductors, semi-insulators, scintillators, and any combination thereof. Neutron detection efficiency is limited for single coated devices since charged particle reaction products have limited ranges in the neutron reactive thin film. The following document addresses two methods to improve neutron detection efficiency, both using morphological alterations: (1) to increase the overall surface area of the device and (2) to increase the statistical probability that the charged particle reaction product will enter the detector sensitive region. The approach proposed is unique in that via holes, or cavities, are etched into the substrate surface using a type of etching such as reaction ion etching techniques or ion milling, methods that allow for very precise and accurate control of miniature dimensions. Cavities etched into the surface of a material are then filled with the neutron reactive material.

The cavities serve to increase the probability that charged particle reaction products will enter the active region of the detector. A variety of materials may be used for the neutron reactive material, such as elemental or any compound forms of $^{10}$B, $^{6}$Li, $^{6}$LiF, U, and Gd. Even plastics such as high density polyethylene (HDPE) can be used. The neutron reaction material has only the requirement that a particle emission results from a neutron interaction (absorption, scatter, fission, etc.).

The present invention is also unique in that cavities can be etched into the substrate surface using dry or wet etching techniques, methods that allow for very precise and accurate control of miniature dimensions. Cavities etched into the surface of a material can be filled with the neutron reaction material, which serves to increase the probability that charged particle reaction products will enter the active region of the detector. $^{10}$B is used throughout the present application only as an example for one possible neutron reactive material. From the previous discussion, the maximum probability that a single charged particle product can enter the detector or active region is 50%, which corresponds to neutron absorption events that occur at the $^{10}$B film/detector interface. By etching a trench into the substrate, the charged particle entrance probability is increased for absorption events that occur in the trench region. Hence, by simply etching trenches in the substrate material before administering the metal contacts and the neutron sensitive films, the overall detection efficiency of the device can be increased. Yet, charged particle reaction products can still be emitted in trajectories parallel or nearly parallel to the trenches, thereby never coming into contact with the active semiconductor detector. This difficulty is resolved by making the trenches circular in shape, or rather, cavities that are etched into the device surface.

Figure 4B:
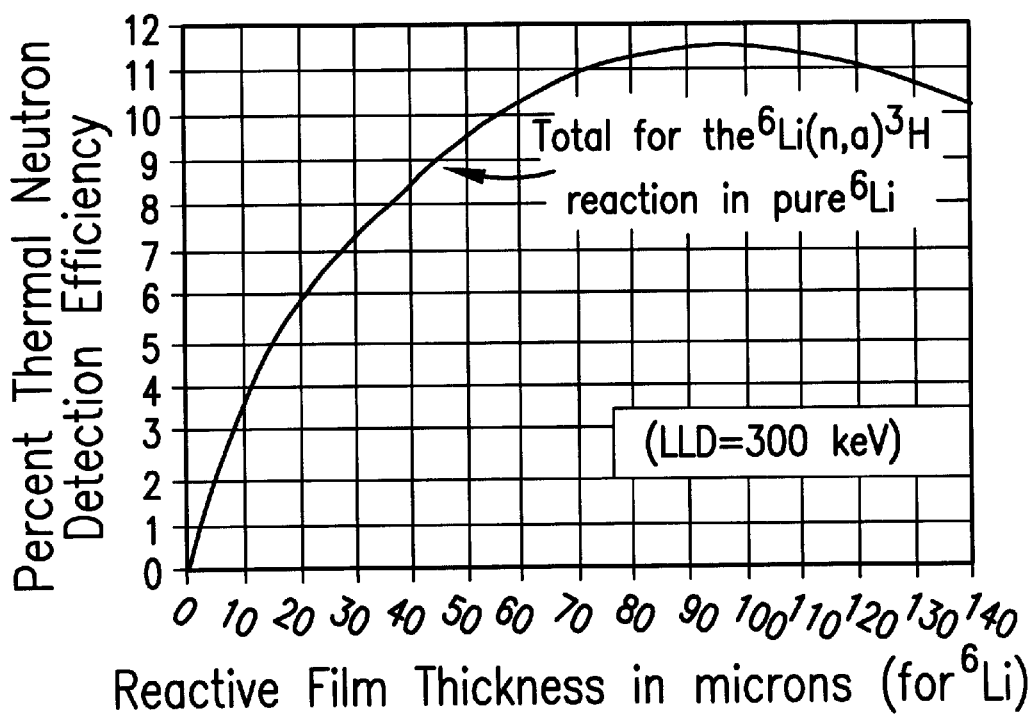
FIG. 4b is a graphic representation of the calculated thermal neutron detection efficiency for a conventional planar $^6$Li-coated semiconductor detector.

Cavities can be precisely etched in semiconductors with very high aspect ratios (exceeding 10:1) with various dry etching techniques such as reactive ion etching (RIE). These well known processes use precision photolithography and VLSI thin film techniques, hence the placement of cavities is straightforward. Preliminary calculations indicate that the cavity diameters should be on the order of the total added charged particle ranges. The cavity sizes are theoretically optimized by making their working diameters nearly the same total effective length L for both charged particle reaction products. In other words, for $^{10}$B $$D = L_{Li} + L_\alpha \quad (7)$$

such that no matter what lateral direction in which the charged particles are emitted, one or the other particle will enter the detector. For instance, the value $L_{Li}+L_\alpha=3.458$ microns, hence the optimized cavity diameter should be approximately 3.5 microns for $^{10}$B coated devices. Etching cavities with depths up to 12 microns can be done simply for cavity diameters of only 3.5 microns, an aspect ratio of less than 3.5:1. The vertical direction can be optimized from equations 5A and 5B. Still, charged particles can escape detection under some circumstances, but as depicted in FIG. 4, the probability of one or the other charged particle reaction products entering the detector is substantially increased. The entire surface is processed such that an optimized matrix of cavities covers the entire device surface (as shown in FIG. 5).

Figure 2:
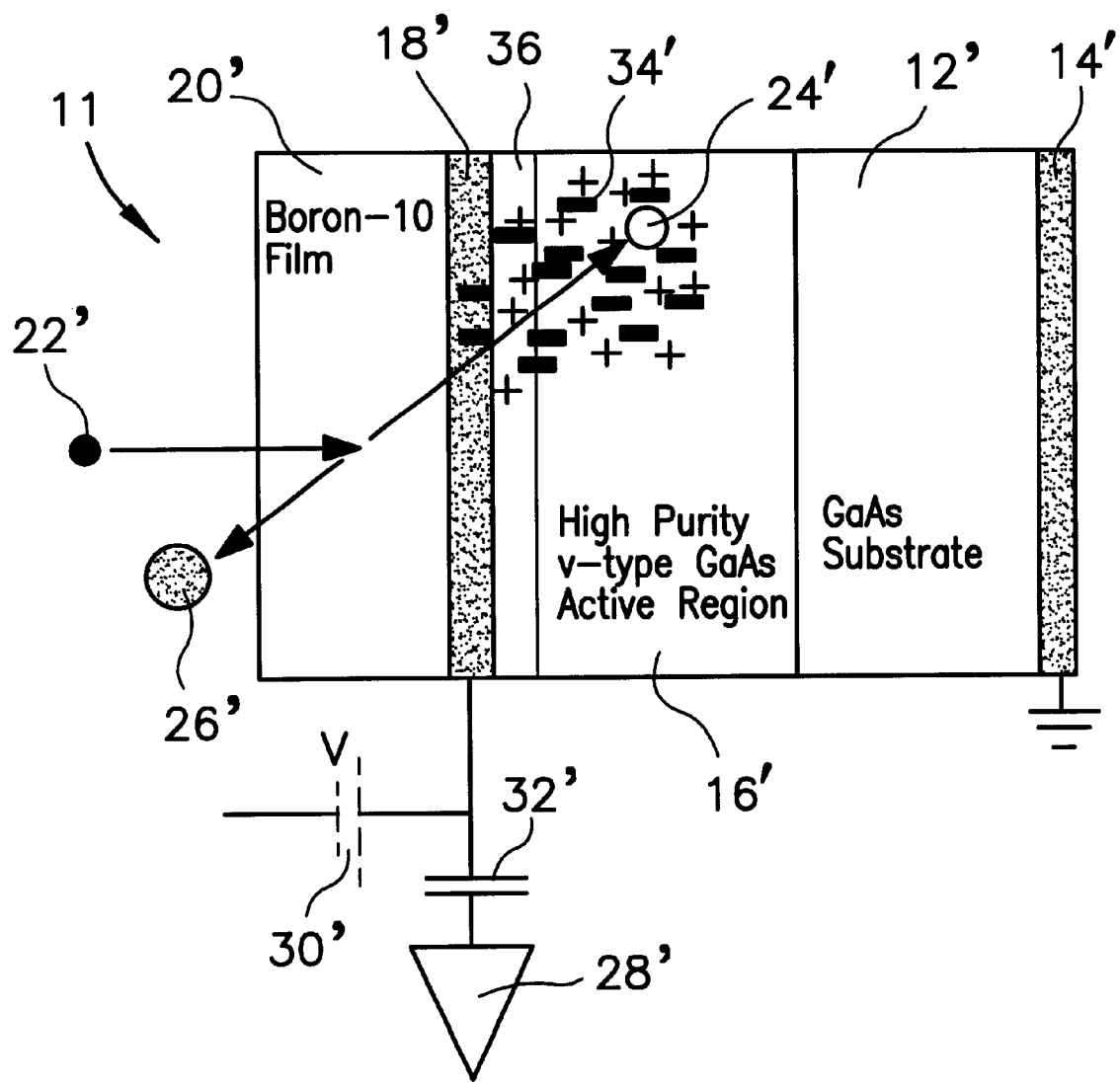
FIG. 2 is a simplified schematic illustration of the basic composition and configuration of a conventional $^{10}$B-coated self-biased high-purity epitaxial GaAs neutron detector with which the present invention is intended for use.

The actual contact of the semiconductor devices can be produced by various means, including implantation, epitaxial growth, evaporation or sputtering. All of these methods have been explored and are well developed. The contacts can be made with the low voltage self-biased design (as shown in FIG. 2) or the highly radiation hard Schottky barrier design. The contact may be fabricated from a semi-insulator, a semiconductor, or a metal. Preliminary calculations indicate that Boron-10 films 2 micron deep cavities covering 50% of the surface area yields a thermal neutron efficiency of 5.9%, a 48% increase in efficiency. The efficiency can be further improved by increasing the cavity depth, leading to more neutron absorption interactions in which more charged particle reaction products can enter into the cavity walls. It is possible to achieve thermal neutron efficiencies greater than 12% with this configuration, a very high efficiency for a radiation hard device that is only a few hundred microns in total thickness. Cavities have been fabricated deeper than 100 microns in GaAs and Si substrates with present technology, hence the fabrication process to construct the proposed device already exists. Cavities with vertical or sloped side walls can be used.

Another advantage of the pocked design of the present invention is its flexibility with compound designs. High-density polyethylene (HDPE) coated devices have been successfully fabricated and are presently under test. The pocked devices can be coated with stacked layers of $^{10}$B and HDPE to increase sensitivity to epithermal neutrons. The stacked layers may also be a combination of $^{6}$Li-based materials and polyethylene. The technology has been shown to work, and the two major reactions are enhanced. Low energy epithermal neutrons lose energy and have a higher probability of being absorbed in the $^{10}$B film, and the (n,p) reaction from neutron collisions in the HDPE film produce energetic protons of detectable energies that have long enough ranges to enter the detector through the applied $^{10}$B film and contact region.

Devices without HDPE can be used as cold neutron detectors having high efficiency. The devices can also be designed as imaging array detectors. Hence, the devices can be used for neutron radiography and radioscopy applications, and their extreme radiation hardness allows them to be used to assist in spent nuclear fuel assessment.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. Apparatus for detecting energetic neutrons comprising:
    a particle detecting semiconductor substrate having a first surface including at least one cavity extending into said semiconductor substrate; and
    a thin neutron responsive layer disposed on the first surface of said semiconductor substrate and responsive to energetic neutrons incident thereon for producing first and second charged reaction particles directed in opposite directions, wherein said neutron responsive layer is further disposed in said at least one cavity for increasing neutron detection efficiency by increasing the likelihood that the charged reaction particles will be directed into said semiconductor substrate.

2. The apparatus of claim 1 wherein said at least one cavity has a width and depth in said semiconductor substrate, and wherein each of said charged reaction particles has respective first and second ranges of travel in said neutron reactive layer, and wherein the width of said at least one cavity is on the order of the sum of the ranges of said first and second charged particles.

3. The apparatus of claim 2 wherein said at least one cavity is generally cylindrical in shape and has a longitudinal axis aligned generally perpendicular to the first surface of said semiconductor substrate.

4. The apparatus of claim 1 wherein the first surface of said semiconductor substrate includes plural cavities arranged in a spaced manner in said semiconductor substrate.

5. The apparatus of claim 4 wherein said plural spaced cavities comprise on the order of 50% of the area of the first surface of said semiconductor substrate.

6. The apparatus of claim 1 wherein said neutron reactive layer is comprised of an elemental or compound form of natural B, $^{10}$B, natural Li, $^{6}$Li, U, natural Gd, $^{155}$Gd, or $^{157}$Gd, or a hydrogen containing material such as plastic or high density polyethylene.

7. The apparatus of claim 1 wherein said semiconductor substrate is comprised of Si, SiC, amorphous Si, GaAs or diamond.

8. The apparatus of claim 1 further comprising a first contact layer disposed on the first surface of said semiconductor substrate and in contact with said neutron reactive layer and forming a rectifying junction.

9. The apparatus of claim 8 wherein said semiconductor substrate includes a second surface and said apparatus further comprises a second low resistivity contact layer disposed on the second surface of said semiconductor substrate and connected to neutral ground for self-biasing said rectifying junction with a low voltage.

10. The apparatus of claim 9 wherein said first contact layer comprises a semi-insulator, a semiconductor or a metal.

11. The apparatus of claim 10 further comprising a voltage source coupled to said first contact layer, and wherein said rectifying junction forms a Schottky barrier.

12. The apparatus of claim 1 wherein said energetic neutrons are cold, thermal, or epithermal neutrons.

13. Apparatus for detecting energetic neutrons comprising:

a particle detecting semiconductor substrate having first and second surfaces, wherein said first surface includes at least one cavity extending into said semiconductor substrate;

a first contact layer disposed on the first surface of said semiconductor substrate including the at least one cavity therein and forming a rectifying junction;

a second low resistivity contact layer disposed on the second opposed surface of said semiconductor substrate and connected to neutral ground for self-biasing said rectifying junction with a low voltage; and a thin neutron responsive layer disposed on the first surface of said semiconductor substrate, wherein an energetic neutron interacts with said neutron responsive layer to produce first and second charged particles directed in opposite directions, and wherein said neutron responsive layer is further disposed in said at least one cavity for increasing the likelihood that the charged particles will be directed into said semiconductor substrate for increased neutron detection efficiency.

14. The apparatus of claim 13 wherein said at least one cavity is generally cylindrical in shape and has a longitunal axis aligned generally perpendicular to the first surface of said semiconductor substrate.

15. Apparatus of claim 14 where the first and second charged particles have respective first and second ranges of travel in said neutron responsive layer, and wherein said at least one cavity has a diameter on the order of the sum of the ranges of travel of said first and second charged particles.

* * * * *